June 8, 1937.  C. M. WALKER  2,082,859
DISPLAY SIGN HOLDER
Filed Dec. 5, 1934
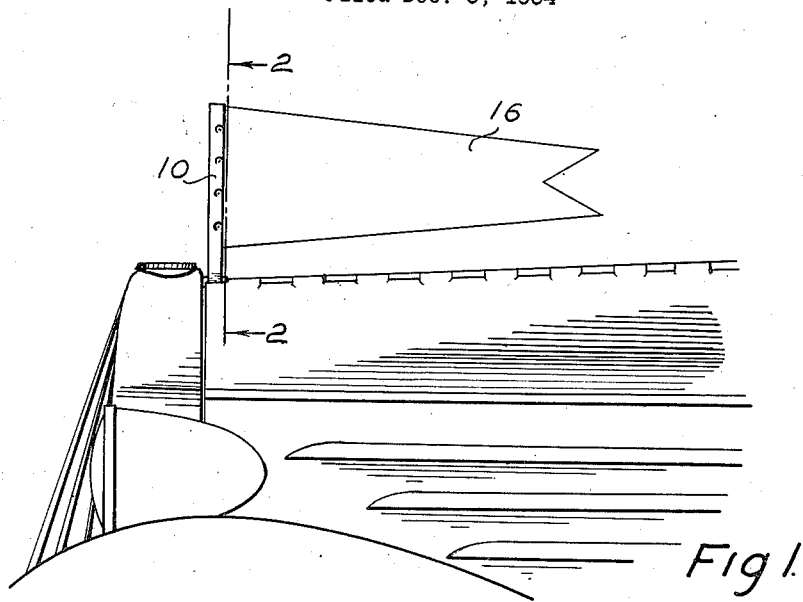
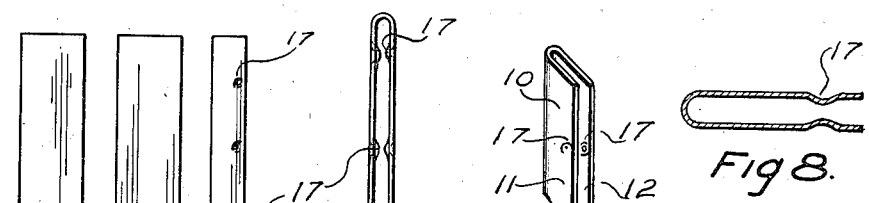
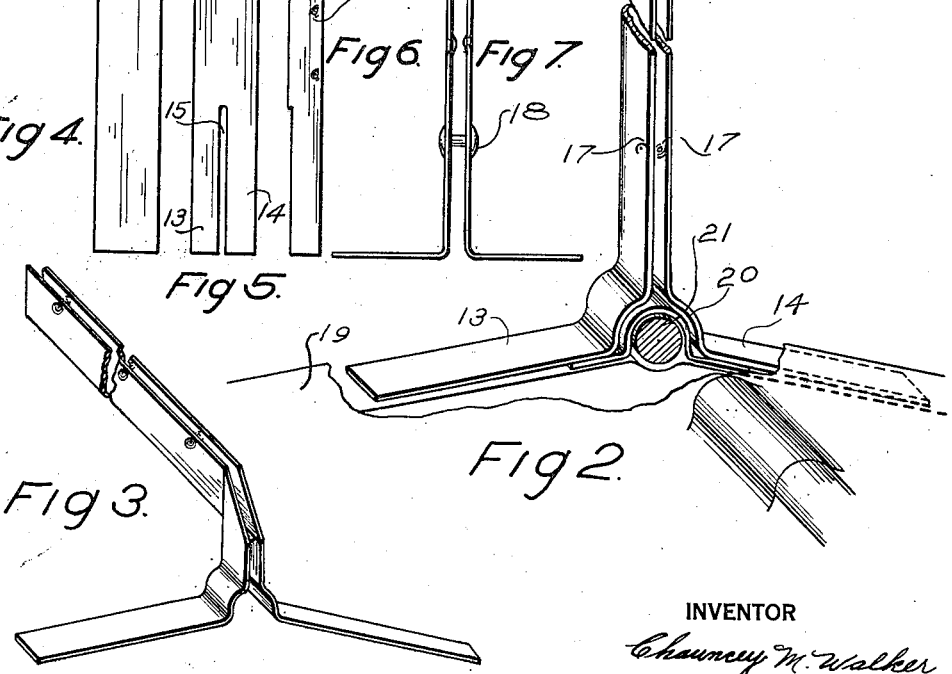
INVENTOR
Chauncey M. Walker Patented June 8, 1937

2,082,859

UNITED STATES PATENT OFFICE 2,082,859

DISPLAY SIGN HOLDER

Chauncey M. Walker, Detroit, Mich., assignor to Albert R. Kimmick, Detroit, Mich.

Application December 5, 1934, Serial No. 756,091

1 Claim. (Cl. 40—129)

This invention relates to improvements in holders for banners or signs, and has particular reference to a holder adapted to display a sign or banner over the hood of an automobile.

An object of my invention is to provide a device of the character referred to, which is simple in construction, inexpensive to manufacture, easily assembled and readily attached to the hood of an automobile by any person without special skill and without the use of tools or equipment.

Another object of the invention is the provision of a device of the character referred to having retaining legs of such construction that they may be bent at will so as to be readily adaptable to any style of automobile hood.

A further object of the invention is the provision of a device having retaining legs of such flexible construction that the body portion thereof may be disposed with reference to the hood of the automobile at any desired angle.

The invention consists in the improved structure and arrangement of parts and in the matter of attaching the holder to the hood of an automobile, all of which will be more fully described hereinafter, the novelty of which will be particularly pointed out and distinctly claimed.

In the accompanying drawing, which constitutes part of my disclosure, I have fully and clearly illustrated a preferred embodiment of my invention, in which drawing:

Fig. 1 is a side elevation of the radiator and hood of an automobile, showing my improved holder in position at the forward end of the hood immediately behind the radiator cap.

Fig. 2 is an enlarged view, partly in section, taken on line 2—2 of Fig. 1 with parts broken away illustrating the manner of adapting my improved holder to the hood of an automobile.

Fig. 3 is a perspective view of a modified form of the device, wherein the body member is horizontally disposed instead of vertically disposed as illustrated in Figs. 1 and 2.

Fig. 4 is a plan view of a piece of sheet metal from which the device may be formed.

Fig. 5 is a plan view of the same piece of metal as illustrated in Fig. 4, with the legs formed thereon.

Fig. 6 is a side elevation of the same piece of metal after it is longitudinally bent through the center, and the retaining bosses are impressed thereon.

Fig. 7 is a front elevation of a modified form of the device made from a strip of sheet metal with a bend at the top of the device instead of along one edge as illustrated in Figs. 1, 2 and 6.

Fig. 8 is a section taken along the line 8—8 of Fig. 6.

Referring now to the drawing by characters of reference, 10, in general, designates my improved holder which is formed with parallel sides 11 and 12 and integral retaining legs 13 and 14.

I prefer to form the holder 10 by providing a rectangular piece of sheet metal of comparatively light gauge, Fig. 4, in one end of which I saw a slot 15, Fig. 5, which slot then defines the retaining legs 13 and 14. After the retaining legs 13 and 14 are formed as aforesaid, I bend the sheet of metal longitudinally through the center, after which it takes the form illustrated in Fig. 6. In order to secure the sign or banner 16 to the holder 10, I employ a variety of methods, one of which is the provision of a plurality of inturned barbs or bosses 17, which are formed preferably along the trailing edge of the holder 10. It is also within the contemplation of the invention that the banner or sign 16 may be secured to the holder 10 by means of conventional rivets 18, Fig. 7.

The sign or banner 16 may be secured to the holder 10 either in the factory or it may be shipped separate and apart from the holder and attached thereto immediately before the holder is positioned on the hood of the car. It is obvious that a holder formed in the manner illustrated in Fig. 2 will exert a gripping or clutching force on the banner after it is inserted between the sides 11 and 12. A holder formed in this manner will enable the user to replace the banner or sign 16 without disturbing the holder when it is in position on the hood of the car. In applications where a heavy cardboard or sheet metal sign or banner is employed, it is advisable to pre-form the same with indentations or holes which are arranged to engage the inturned bosses 17 and serve as means to lock the sign or banner 16 against vertical or horizontal displacement.

In Fig. 2 I illustrate how the holder 10 is secured under the hood cover 19 of a conventional automobile. In the disclosure illustrated in Fig. 2 the legs 13 and 14 are bent to allow the holder 10 to be superimposed upon the loop member 20, which is secured to the top and back of the automobile radiator and which loop 20 serves as the retaining element for the hinge rod 21 of the hood cover 19. The retaining legs 13 and 14 of the holder 10 are readily insertable under the hood cover 19 when the hood cover latches are released. After the retaining legs 13 and 14 are put in a position illustrated in Fig. 2, the hood cover latches (not shown), are fastened, whereupon the hood cover 19 exerts force against the legs 13 and 14 to lock them into position.

In Fig. 3 I have illustrated a modified form of my invention wherein the body of the holder is disposed in a horizontal position. In this modification, a sign, banner, or any ornamental element may be secured along its bottom edge to the holder. Such a modification is also practical in cases where it is desirable to support the unsecured end of an unusually large and heavy sign or banner. The modified form of device as illustrated in Fig. 3 is readily adaptable to the rear end of the hood cover in the same manner as is employed in attaching the holder to the front end of the hood as hereinabove described.

It is obvious that sign holders made in the manner hereinabove described may be easily packed and shipped in a minimum of space, inasmuch as they can be shipped flat and the legs can be bent into position immediately before installation. This is a feature which is not possible of accomplishment with other forms of holders.

Having described my invention, what I claim and desire to secure by Letters Patent is:

In a device of the character described, the combination of an automobile radiator, two hood portions longitudinally hingedly connected and having opposed spaced edge faces forwardly of said hinged connection, and the front extremities of said hood portions resting upon said radiator, of a U-shaped holder adapted to engage opposite sides of a sign adjacent one margin thereof, and two legs integral with said holder, each leg forming a downward extension of one side of the holder and extending between the opposed spaced edge faces of the hood portions, said legs terminating in extremities outwardly flexed in opposite directions whereby each leg extremity extends laterally outwards under one hood portion by which it is frictionally held upon said radiator.

CHAUNCEY M. WALKER.